United States Patent
Yanagisawa

(10) Patent No.: US 6,765,713 B2
(45) Date of Patent: Jul. 20, 2004

(54) ELECTROPHORETIC COMPOSITION, IMAGE DISPLAY MEDIUM USING SAME AND IMAGE DISPLAY DEVICE

(75) Inventor: Masahiro Yanagisawa, Okayama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/409,077

(22) Filed: Apr. 9, 2003

(65) Prior Publication Data

US 2003/0230487 A1 Dec. 18, 2003

(30) Foreign Application Priority Data

Apr. 10, 2002 (JP) .................................. 2002-108296

(51) Int. Cl.$^7$ .................. G02B 26/00; C08K 5/54; C08L 83/00
(52) U.S. Cl. ................... 359/296; 524/268; 524/588
(58) Field of Search ................. 359/296; 524/588, 524/268; 252/573

(56) References Cited

U.S. PATENT DOCUMENTS

| | | | | |
|---|---|---|---|---|
| 5,998,498 A | * | 12/1999 | Vanderlaan et al. | ........ 523/107 |
| 6,367,929 B1 | * | 4/2002 | Maiden et al. | .......... 351/160 H |
| 6,542,284 B2 | * | 4/2003 | Ogawa | ........................ 359/296 |
| 6,590,696 B2 | * | 7/2003 | Yanagisawa et al. | ........ 359/296 |
| 2001/0049400 A1 | * | 12/2001 | Alli et al. | ........................ 522/4 |
| 2002/0027701 A1 | * | 3/2002 | Yanagisawa et al. | ........ 359/267 |
| 2002/0044333 A1 | * | 4/2002 | Shigehiro et al. | ........... 359/295 |
| 2002/0146572 A1 | * | 10/2002 | Yanagisawa | ................ 428/447 |

FOREIGN PATENT DOCUMENTS

JP         2002062545 A   *   2/2002   ........... G02F/1/167

\* cited by examiner

*Primary Examiner*—David N. Spector
(74) *Attorney, Agent, or Firm*—Oblon, Spivak, McClelland, Maier & Neustadt, P.C.

(57) ABSTRACT

An electrophoretic composition in the form of a dispersion containing a dispersion medium, and electrophretic particles dispersed in the dispersion medium and having a color selected from white and non-white colors. The dispersion medium includes a non-polar solvent, a sulfonic acid compound soluble at least partly in said non-polar solvent, and a polymeric material soluble in said non-polar solvent.

21 Claims, 3 Drawing Sheets

ELECTROPHORETIC COMPOSITION, IMAGE DISPLAY MEDIUM USING SAME AND IMAGE DISPLAY DEVICE

BACKGROUND OF THE INVENTION

1. Field of the Invention

This invention relates to an electrophoretic composition and to an image display medium using the silicone-oil soluble polymer. The present invention is also directed to an image display device using the image display medium. More particularly the present invention relates to an electrophoretic composition which can reversibly form an image of white and/or colored particles contained therein and moveable upon application of an electric field.

2. Discussion of the Prior Art

Display devices such as cathode ray tubes (CRTs) and liquid crystal displays (LCDs) have been used as an image display terminal for displaying images such as letters, static images and moving images. These devices can instantaneously display images (i.e., digital data) and rewrite the images. However, these devices have various drawbacks. For, example, it is a hard work to always carry such devices. In addition, to see such a display device for a long period of time causes eye fatigue. Further, when such a display device displaying images is turned off, the images are disappeared.

When images such as letters and static images are distributed or stored as a document, the images are typically recorded by a printer on a paper medium to form a hardcopy. Images on such a hardcopy are easier to read than those in the display devices mentioned above. In addition, when reading images on hardcopies, the degree of eye fatigue is much less than that when reading images in the display devices. Further, a reader can see images on hardcopies while having a free posture. Furthermore, hardcopies can be easily carried because of having lightweight. However, hardcopies have a problem in view of material saving such that much labor and costs are necessary to recycle used hardcopies.

Therefore, a need has been existed for a paper-like image display medium having a combination of the advantages of the above-mentioned display devices and the advantages of hardcopies. Until now, display media using a liquid crystal dispersed in a polymer, a bistable cholesteric liquid crystal, an electrochromic material or an electrophoretic material have been proposed. These media are a reflection type and therefore can display high contrast images. In addition, the media can be used as a memorable display medium (i.e., the media have an image maintaining ability even when the power is off).

Among these media, devices using an electrophoretic material have good display qualities and low power consumption and therefore are advantageous over other media. A typical electrophoretic display medium is disclosed in Japanese Laid-Open Patent Publication No. 5-173194 or Japanese Patent No. 2,612,472. In the electrophoretic display medium, an electrophoretic liquid containing electrophoretic particles having a color and dispersed in a dispersion medium having a different color is contained in a cell formed by a pair of first and second electrodes. When a voltage having a polarity opposite to the charge of the electrophoretic particles is applied to the first electrode, the particles move toward the first electrode, resulting in deposition of the particles on the first electrode. To the contrary, when a voltage having the same polarity as the charge of the electrophoretic particles is applied to the first electrode, the particles move toward the second electrode, so that the color of the dispersing medium can be seen from the side of the first electrode. Thus, images can be reversibly displayed.

It is well known that the dispersion of the electrophoretic particles can be stabilized by electrostatic repulsion effect and a stereo effect (i.e., a so-called adsorption layer effect). With respect to the electrostatic repulsion effect, a DLVO theory is established. In this theory, the thickness of the electric double layer and the phase boundary potential (i.e., the so-called $\zeta$ (zeta) potential) are important factors. Therefore, ions for forming such an electric double layer and a phase boundary potential are needed. Several investigations have been made for aqueous dispersion in which ions can be present.

With respect to the stereo effect, a theory corresponding to the DLVO theory has not yet been established. An investigation using a non-aqueous dispersion system (e.g., petroleum solvent dispersion systems) is reported by F. A. Waite in J. Oil Col. Chem. Assoc., 54, 342 (1971). This investigation relates to a fundamental method for manufacturing a stable non-aqueous solvent dispersion. In this method, a block or graft copolymer which has both a component having an affinity for the particles dispersed in a dispersing medium and another component soluble in the dispersing medium is used.

Japanese Patent Publication No. S40-7047 discloses a method for manufacturing a dispersion, which utilizes the above-mentioned method. In the method, methyl methacrylate is radically polymerized in a hydrocarbon solvent in the presence of a degradable rubber to prepare a stable polymethyl methacrylate dispersion. It is considered that methyl methacrylate is graft-copolymerized with the degradable rubber because it is unlikely that the polymethyl methacrylate particles adsorb the degradable rubber. In addition it is considered that when the graft copolymer is included in a display dispersion, the insoluble part of the graft copolymer associates with the surface of particles therein, and the soluble part of the graft copolymer has a stereo effect. Thus, the dispersion stability of the particles can be maintained.

However, the stability of the electrophoretic particles in a dispersion using a non-aqueous solvent is not sufficiently high. Namely, there is a limitation in service life of the image display medium in which such a dispersion is used.

The present inventor investigated a non-polar aprotic solvent type dispersion including (a) an organic material having an acidic group but not having a basic group, (b) an organic material having a basic group but not having an acidic group and (c) an organic material which is compatible with the non-polar aprotic solvent and which has a nonionic polar group (either one of the components (a) and (b) may be copolymerized with the component (c)). As a result of the investigation, the following findings were obtained. Namely, the components (a) and (b) cause an acid-base ionic dissociation in the non-polar solvent with the simultaneous occurrence of salvation (i.e., ion-dipole interaction). When the components (a), (b) and (c) are present in the non-ionic solvent, ions can be stably present in the non-polar aprotic solvent because of an acid-base dissociation of components (a) and (b) associated with the solvation of the polar group of the component (c). In addition, when solid particles such as pigments and metal oxide particles are present in a system including the components (a), (b) and (c), the particulate material can be dispersed more stably. The reason is considered to be that the acidic or basic group of the components (a) and (b) is combined with the particulate material by chemical bonding, adsorption, etc., and fixed thereon.

Thereby ionic dissociation occurs at the interface between the surface of the particulate material and the solvent through the solvated component (c). As a result, the particulate material is uniformly charged positively or negatively and can be stably dispersed by the synergy effect of this electrostatic effect and a stereo effect. In Japanese Laid Open Patent Publication No. 2002-62545, published Feb. 28, 2002, the present inventor has proposed an electrophoretic liquid containing a petroleum type solvent (non-polar aprotic solvent) in which charged electrophoretic particles are dispersed.

SUMMARY OF THE INVENTION

It has been found that the known electrophoretic liquid as proposed in Japanese Laid Open Patent Publication No. 2002-62545 has a problem because a high intensity electric field should be applied in order to obtain a desired speed of migration of the electrophoretic particles (display speed).

The present invention has been made to solve the above-mentioned problem.

In accordance with one aspect of the present invention an electrophoretic composition in the form of a dispersion comprising a dispersion medium, and electrophoretic particles dispersed in said dispersion medium and having a color selected from white and non-white colors, said dispersion medium comprising:
(a) a non-polar solvent,
(b) a sulfonic acid compound soluble at least partly in said non-polar solvent, and
(c) a polymeric material soluble in said non-polar solvent.

Because of the presence of the polymeric material, the electrophoretic particles can be stably dispersed in the non-polar solvent. Further, the sulfonic acid compound is dissociated in the solvent to cause the electrophoretic particles to be charged. As a consequence, the migration speed of the electrophoretic particles is high enough even at a low electric field.

In another aspect the present invention provides an image display medium comprising a pair of opposing electroconductive layers defining a gap therebetween, and the above electrophoretic composition filled in said gap, at least one of said electroconductive layers being light-transmissive.

The present invention also provides an image displaying device comprising the above image displaying medium.

It is an object of the present invention to provide an electrophoretic composition which has improved dispersion stability and improved migration speed of the electrophoretic particles.

Another object of the present invention is to provide an image display medium which can maintain displayed images for a long period of time and which has improved responsibility to an applied voltage.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS OF THE INVENTION

Figure 1:
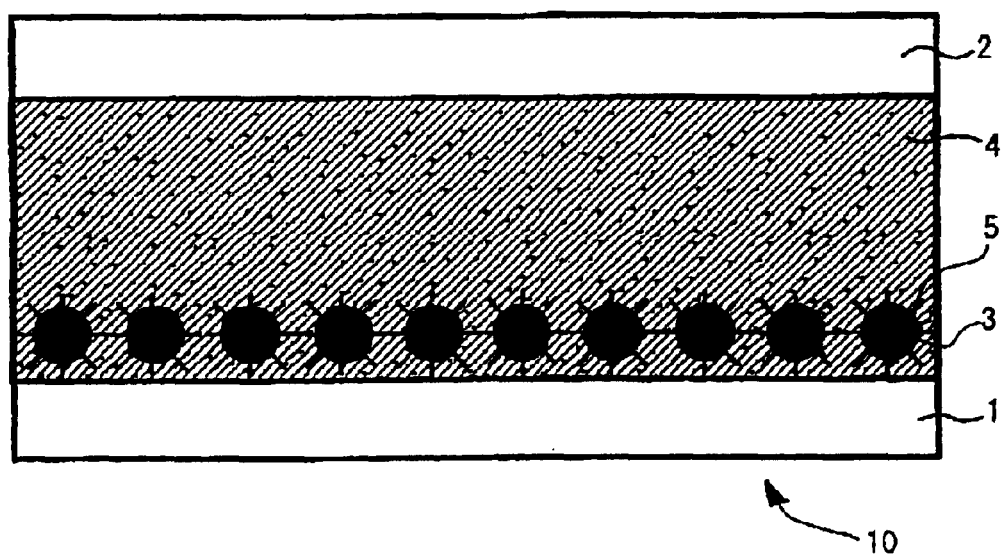
FIG. 1 is a cross-sectional view schematically illustrating an image display medium of the present invention.

An electrophoretic composition of the present invention is in the form of a dispersion and contains a dispersion medium, and electrophretic particles dispersed in the dispersion medium and having white or any other desired color. The dispersion medium comprises:
(a) a non-polar solvent,
(b) a sulfonic acid compound soluble in the non-polar solvent at least partly, and
(c) a polymeric material soluble in the non-polar solvent.

Any non-polar solvent may be used for the purpose of the present invention. Suitable examples of the non-polar solvent include paraffinic hydrocarbon oils such as pentane, hexane, heptane, octane, nonane, decane and dodecane; isoparaffinic hydrocarbons such as isohexane, isooctane and isododecane; alkylnaphthalene hydrocarbons such as fluid paraffin; aromatic hydrocarbons such as benzene, toluene, xylene, alkylbenzene and solvent naptha; and silicone oils such as dimethylsilicone oil, phenylmethylsilicone oil, dialkylsilicone oil, alkylphenylsilicone oil, cyclic polydialkylsiloxane and cyclic polyalkylphenylsiloxane.

The sulfonic acid compound used in the electrophoretic composition should be soluble at least partly, preferably completely, in the non-polar solvent and generally has a molecular weight of 96 to 500.

Suitable sulfonic acid compound may be, for example, an alkane sulfonic acid having 1 to 30 carbon atoms, an alkylbenzene sulfonic acid having 7 to 30 carbon atoms or an alkylnaphthalene sulfonic acid having 11 to 30 carbon atoms. These sulfonic acid compounds may be used singly or as a mixture of two or more thereof. Particularly preferably used is a long-chain alkylbenzene sulfonic acid having 10 to 30 carbon atoms, such as dodecylbenzenesulfonic acid.

Such a sulfonic acid when dissolved in the non-polar solvent dissociates as follows:

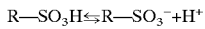

Although not wishing to be bound by the theory, the proton thus formed is considered to interact with the electrophoretic particles to increase the amount of charge on the electrophoretic particles so that the electrophoretic particles have improved responsibility to a change in an applied electrical field.

The polymeric material used in the present invention should be soluble in the non-polar solvent and may be a thermoplastic resin or a thermosetting resin. It is preferred that the polymeric material exhibit a greater interaction and a stronger attracting force to the electrophoretic particles than to the non-polar solvent, because the polymeric material has an increased tendency to be adsorbed on the surfaces of the electrophoretic particles and to stabilize the electrophoretic particles in the dispersion medium due to an enhanced stereo effect. Examples of the polymeric material include polymers containing at least one monomer having a strong affinity or compatibility with the non-polar solvent include alkyl or aryl esters of acrylic acid or methacrylic acid.

It is also preferred that the polymeric material be an acidic group-containing polymer or copolymer containing at least a monomer having an acidic group as its monomer component. Such a monomer providing the acidic group-containing polymeric material may be, for example, acrylic acid, methacrylic acid, maleic acid, maleic anhydride, itaconic acid, itaconic anhydride, fumaric acid, cinnamic acid, crotonic acid, vinylbenzoic acid, 2-methacryloxyethylsuccinic acid, 2-methacryloxyethylmaleic acid, 2-methacryloxyethylhexahydrophthalic acid, 2-methacryloxyethyltrimellitic acid, vinyl sulfonic acid, allyl sulfonic acid, styrene sulfonic acid, 2-sulfoethyl methacrylate, 2-acrylamide-2-methylpropane sulfonic acid, 3-chloroamidephosphoxypropyl methacrylate, 2-methacryloyloxyethyl acid phosphate and hydroxystyrene. When dissolved in the non-polar solvent, the acidic group-containing polymeric material provides a proton dissociated from, for example, COOH or SO$_3$H group, in the dispersion medium. The proton thus formed is considered to interact with the electrophoretic particles to increase the amount of charge on the electrophoretic particles so that the electrophoretic particles have not only improved stability due to the stereo effect attained by the large molecules thereof but also higher speed of response to a change in an applied electrical field.

It is also preferred that the polymeric material is a polymer obtained from a monomer having the following formula (1):

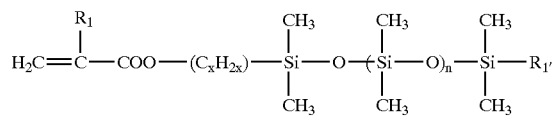

(I)

wherein $R_1$ represents a hydrogen atom or a methyl group; $R_1'$ represents a hydrogen atom or an alkyl group having 1 to 4 carbon atoms, n is an integer and x is an integer of from 1 to 3.

In the compound of the formula (1), $R_1$ is preferably a methyl group; $R_1'$ is preferably a methyl group, n (average number of repeating units) is preferably 2 to 200, more preferably 5 to 100, and x is preferably 3. Because the polymeric compound having a monomer component of the formula (1) has very strong affinity with the non-polar solvent, the polymeric compound can be adsorbed on the electrophoretic particles so that a high degree of the stereo effect for the stabilization of the dispersion is obtained.

It is also preferred that the polymeric material has a non-ionic polar group. Examples of the non-ionic polar group-containing polymeric material include copolymers of a polar group-containing copolymerizable monomer with at least one monomer selected from the group consisting of alkyl acrylates, alkyl methacrylates, aryl acrylate and aryl methacrylate. The polar group-containing monomer may be, for example, 2-hydroxyethyl acrylate, 2-hydroxyethyl methacrylate, 2,3-dihydroxypropyl acrylate, 2,3-dihydroxypropyl methacrylate, 4-hydroxybutyl acrylate, 4-hydroxybutyl methacrylate, 2-hydroxy-3-propyl methacrylate, 2-chloroethyl acrylate, 2-chloroethyl methacrylate, 2,3-dibromopropyl acrylate, 2,3-dibromopropyl methacrylate, acrylonitrile, methacrylonitrile, isobutyl-2-cyanoacrylate, 2-cyanoethyl acrylate, ethyl-2-cyanoacrylate, methacrylacetone, tetrahydrofurfurylmethacrylate, trifluoroethylmethacrylate, p-nitrostyrene, vinyl pyrrolidone, N-acryloylmorpholine, acrylamide, methacrylamide, N,N-dimethylmethacrylamide and N,N-dibutylmethacrylamide.

Because of the presence of the non-ionic polar group-containing polymeric material dissolved in the dispersion medium, the charged electrophoretic particles may be solvated so that the amount of charges on the electrophoretic particles increases, thereby allowing for higher speed of response of the electrophoretic display medium to a change in an applied electrical field.

The amount of the sulfonic acid compound is generally 0.01 to 1% by weight based on the weight of the non-polar solvent. The amount of the polymeric material is generally 1 to 20% by weight based on the weight of the non-polar solvent.

Preferably, the dispersion medium additionally contains a compound having non-ionic polar group and soluble in the dispersion medium. The non-ionic polar group may be, for example, a hydroxyl group, an ester group, an ether group, a ketone group, an aldehyde group, a halogen atom and amide group. Because of the presence of the non-ionic polar group-containing compound dissolved in the dispersion medium, the charged electrophoretic particles may be solvated so that the amount of charges on the electrophoretic particles increases, thereby allowing for higher speed of response of the electrophoretic display medium to a change in an applied electrical field.

The electrophoretic particles for use in the present invention include white and any other colored pigment particles which are substantially insoluble in the dispersion medium. Specific examples of the pigment particles include (a) inorganic metal oxides such as silica, titania and alumina, (b) black coloring agents such as such as carbon black, aniline black, furnace black and lamp black, (c) cyan coloring agents such as phthalocyanine blue, Methylene Blue And Victoria Blue, Methyl Violet, Aniline Blue And Ultramarine Blue (d) magenta coloring agents such as Rhodamine 6G Lake, Dimethyl Quinacridone, Watching Red, Rose Bengal, Rhodamine B and Alizarin Lake, and (e) yellow coloring agents such as Chrome Yellow, Benzidine Yellow, Hanza Yellow, Naphthol Yellow, Molybdenum Orange, Quinoline Yellow and Tartrazine. The electrophoretic particles generally have a particle diameter in the range of 0.1 to 10 µm.

It is preferred that the electrophoretic particles have basic group-containing surfaces.

When basic groups such as —NH$_2$ are present on surfaces of the electrophoretic particles, the basic groups are dissociated because of the presence of proton derived from the sulfonic acid compound contained in the dispersion medium as shown below:

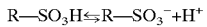

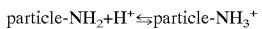

so that the electrophoretic particles have an increased amount of charged, thereby allowing for an improved responsibility to a change in an applied electrical field.

In one preferred embodiment, the basic group-containing electrophoretic particles are comprised of a binder resin which is insoluble in the non-polar solvent and which is a polymer or copolymer containing a basic group-containing monomer component. The binder resin serves to support the pigment particles.

The amount of the pigment particles is 0.1 to 300 parts by weight, preferably 1 to 100 parts by weight, per 10 parts by weight of the binder resin.

The binder resin is preferably a copolymer of a basic group-containing comonomer with another comonomer.

Examples of the basic group-containing comonomer include N-methylaminoethyl acrylate, N-methylaminoethyl methacrylate, N-ethylaminoethyl acrylate, N-ethylaminoethyl methacrylate, N,N-dimethylaminoethyl acrylate, N,N-dimethylaminoethyl methacrylate, N,N-diethylaminoethyl acrylate, N,N-diethylaminoethyl methacrylate, N,N-dibutylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyre-ne, diphenylaminoethylstyrene, N-phenylaminoethylstyrene, 2-N-piperidylethyl acrylate, 2-N-piperidylethyl methacrylate, 2-vinylpyridine, 4-vinylpyridine and 2-vinyl-6-methylpyridine. Examples of the another comonomer include alkyl acrylates, alkyl methacrylates, aryl acrylate and aryl methacrylate.

By properly selecting monomers and adjusting the mixing ratio, insoluble binder resins having a basic group can be prepared. The electrophoretic particles having the binder resin of a basic group-containing copolymer may be obtained by dispersing the pigment particles in the binder resin in the non-polar solvent using a suitable mixing device such as a ball mill, a sand mill or an attritor. As a result of the dispersion treatment, the pigment particles are adsorbed and supported by the binder to obtain electrophoretic particles.

In a second preferred embodiment, the basic group-containing electrophoretic particles are comprised of a binder resin which is insoluble in the non-polar solvent and which is a polymer or copolymer containing a basic group-containing monomer component and a non-ionic polar group-containing monomer component. The binder resin is preferably a copolymer of a basic group-containing comonomer, a non-ionic polar group-containing comonomer and an additional comonomer selected from the group consisting of alkyl acrylates, alkyl methacrylates, aryl acrylate, aryl methacrylate and mixtures thereof. The basic group-containing comonomer is preferably at least one monomer selected from the group consisting of N-methylaminoethyl acrylate, N-methylaminoethyl methacrylate, N-ethylaminoethyl acrylate, N-ethylaminoethyl methacrylate, N,N-dimethylaminoethyl acrylate, N,N-dimethylaminoethyl methacrylate, N,N-diethylaminoethyl acrylate, N,N-diethylaminoethyl methacrylate, N,N-dibutylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyrene, diphenylaminoethylstyrene, N-phenylaminoethylstyrene, 2-N-piperidylethyl acrylate, 2-N-piperidylethyl methacrylate, 2-vinylpyridine, 4-vinylpyridine and 2-vinyl-6-methylpyridine. The non-ionic polar group-containing comonomer is preferably at least one monomer selected from the group consisting of 2-hydroxyethyl acrylate, 2-hydroxyethyl methacrylate, 2,3-dihydroxypropyl acrylate, 2,3-dihydroxypropyl methacrylate, 4-hydroxybutyl acrylate, 4-hydroxybutyl methacrylate, 2-hydroxy-3-propyl methacrylate, methoxypolyethyleneglycol methacrylate, methoxypolypropyleneglycol methacrylate, 2-chloroethyl acrylate, 2-chloroethyl methacrylate, 2,3-dibromopropyl acrylate, 2,3-dibromopropyl methacrylate, acrylonitrile, methacrylonitrile, isobutyl-2-cyanoacrylate, 2-cyanoethyl acrylate, ethyl-2-cyanoacrylate, methacrylacetone, tetrahydrofurfuryl methacrylate, trifluoroethyl methacrylate, p-nitrostyrene, vinylpyrrolidone, N-acryloylmorpholine, acrylamide, methacrylamide, N,N-dimethylmethacrylamide, N,N-dibutylmethacrylamide.

Because of the presence of the non-ionic polar groups in addition to the basic groups on the surfaces of the electrophoretic particles, solvation occurs on the surfaces of the particles so that the amount of charges on the electrophoretic particles increases, thereby allowing for higher speed of response of the electrophoretic display medium to a change in an applied electrical field.

In a third preferred embodiment, the basic group-containing electrophoretic particles comprises pigment particles which have been surface-treated with a monomer having a basic group or a silane coupling agent having a basic group. The basic group-containing monomer is preferably at least one monomer selected from N-methylaminoethyl acrylate, N-methylaminoethyl methacrylate, N-ethylaminoethyl acrylate, N-ethylaminoethyl methacrylate, N,N-dimethylaminoethyl acrylate, N,N-dimethylaminoethyl methacrylate, N,N-diethylaminoethyl acrylate, N,N-diethylaminoethyl methacrylate, N,N-dibutylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyre-ne, diphenylaminoethylstyrene, N-phenylaminoethylstyrene, 2-N-piperidylethyl acrylate, 2-N-piperidylethyl methacrylate, 2-vinylpyridine, 4-vinylpyridine and 2-vinyl-6-methylpyridine.

The basic group-containing coupling agent is preferably selected from the group consisting of γ-aminopropyltrimethoxysilane, γ-aminopropyltriethoxysilane, N-phenyl-γ-aminopropyltrimethoxysilane, N-(β-aminoethyl)-γ-aminopropyltrimethoxysilane and N-(β-aminoethyl)-γ-aminopropyltrimethoxysilane.

Because of the presence of the basic groups on the surfaces of the electrophoretic particles, the amount of charges on the electrophoretic particles increases, thereby allowing for higher speed of response of the electrophoretic display medium to a change in an applied electrical field.

The amount of the electrophoretic particles is generally 1 to 20 based on the weight of the dispersion medium.

The dispersion medium may further contains a dye dissolved therein and having a color different from that of the electrophoretic particles for the purpose of providing an electrophoretic display medium having a high image contrast. The dye is preferably oil-soluble dyes and may be those belonging to Solvent dyes in Colour Index. Specific examples of such dyes include Spirit Black (SB, SSBB, and AB), Nigrosine Base (SA, SAP, SAPL, EE, EEL, EX, EXBP and EB), Oil Yellow (105, 107, 129, 3G and GGS), Oil Orange (201, PS and PR), Fast Orange, Oil Red (5B, RR and OG), Oil Scarlet, Oil Pink 312, oil Violet #730, Macrolex Blue RR, Sumiplast Green G, Oil Brown (GR and 416), Sudan Black X60, Oil Green (502 and BG), Oil Blue (613, 2N and BOS), Oil Black (HBB, 860 and BS), Varifast Yellow (1101, 1105, 3108 and 4120), Varifast Orange (3209 and 3210), Varifast Red (1306, 1355, 2303, 3304, 3306 and 3320), Varifast Pink 2310N, Varifast Brown (2402 and 3405), Varifast Blue (3405, 1501, 1603, 1605, 1607, 2606 and 2610), Varifast Violet (1701 and 1702), and Varifast Black (1802, 1807, 3804, 3810, 3820 and 3830). The amount of the dye is not specifically limited and is such that a desired color intensity is obtained.

The constituents of the image display medium of the present invention will be next explained.

Referring to FIG. 1, designated generally as 10 is an image display medium according to the present invention. The medium 10 has a pair of opposing electroconductive layers 1 and 2 defining therebetween a gap in which the above electrophoretic composition containing electrophoretic particles 3 dispersed in a dispersion medium 4 is filled. At least one of the electroconductive layers 1 and 2 is light-transmissive so that the color of the electrophoretic particles 3 can be seen. The gap is generally 5 to 300 μm. Designated as 5 is a soluble polymeric material which is adsorbed on surfaces of the electrophoretic particles 3. A dye having a color different from that of the electrophoretic particles 3 is dissolved in the dispersion medium 4.

The electroconductive layers 1 and 2 may be a single self-supporting electroconductive film or a composite film having a support layer (e.g. a glass layer or a plastic layer) on which an electroconductive coating is provided. A metal such as Al, Ag, Ni and Cu or a transparent electroconductive material such as ITO (indium tin oxide), $SnO_2$ and ZnO is used for forming the electroconductive layer by sputtering, vacuum evaporation, chemical vapor deposition or coating. When a coating method is adopted, an electroconductive material is dispersed or dissolved in a suitable solvent optionally together with a binder such as a resin and the resulting coating liquid is applied to a substrate. Specific examples of such electroconductive materials include cationic polymer electrolytes such as polymethylbenzyltrimethylammonium chloride, and polyallylpolymethylammonium chloride; anionic polymer electrolytes such as polystyrenesulfonic acid salts and polyacrylic acid salts; and electronic conductors such as zinc oxide, tin oxide and indium oxide.

The electroconductive layers 1 and 2 may be a layer having an anisotropic conductivity, or a layer having a patterned or multi-dot segment in which a conductive portion is formed through the thickness direction of the layer. In any case, when an electric field is applied imagewise between the electroconductive layers 1 and 2, an image can be easily formed.

Figure 2A:
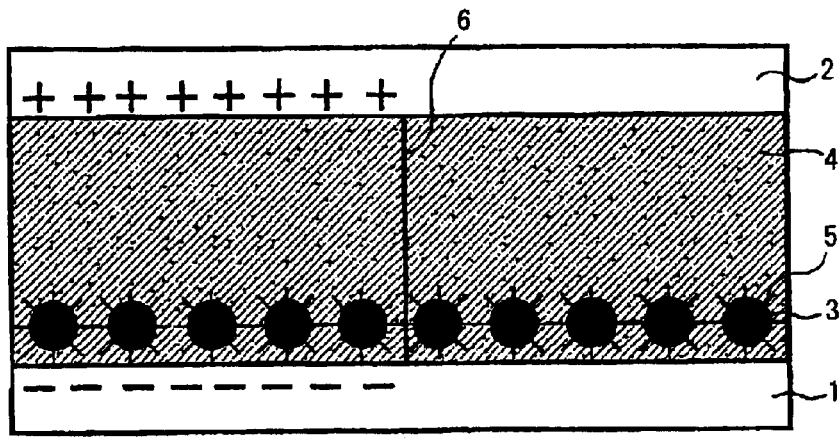
FIGS. 2A to 2C are schematic views similar to FIG. 1 explanatory of image display procedures of the display medium of the present invention.
Figure 2B:
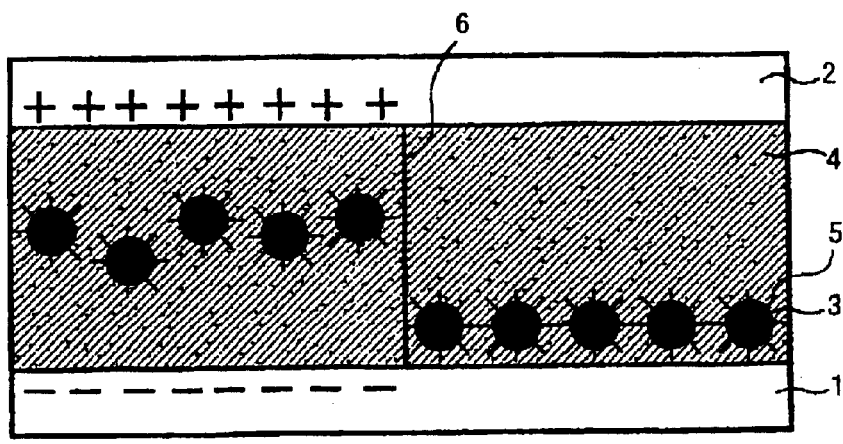
Figure 2C:
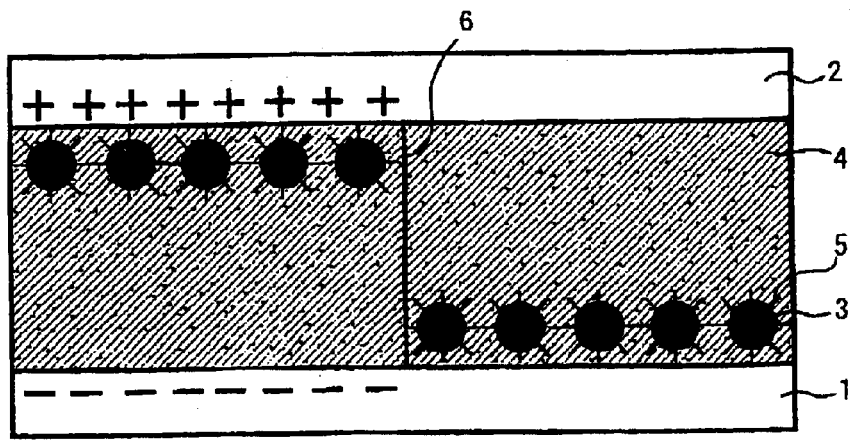

Referring to FIGS. 2A to 2C, are cross-sectional views for explaining the image displaying mechanism of the image display medium of the present invention. The cell is separated by a spacer 6 into left and right cells. When a charge (hereinafter referred to as an external charge) is applied from outside by a proper charge applicator (i.e., a voltage applicator), which is not shown, to the dispersion included in the left cell, the colored electrophoretic particles 3, move upward due to the electric field formed by the external charge as shown in FIG. 2B. In FIG. 2C, the electrophoretic particles 3 reach the electroconductive layer 2. At this point, the electrophoretic particles 3 electrostatically adhere to the layer 2. When the display medium is seen from a point over the layer 2, the left side of the display medium in FIG. 2C has the color of the electrophoretic particles 3, while the right side of the display medium has the color of the dye dissolved in the dispersion medium 4. This image display process is reversible, and therefore the image display medium can be repeatedly used.

Figure 3:
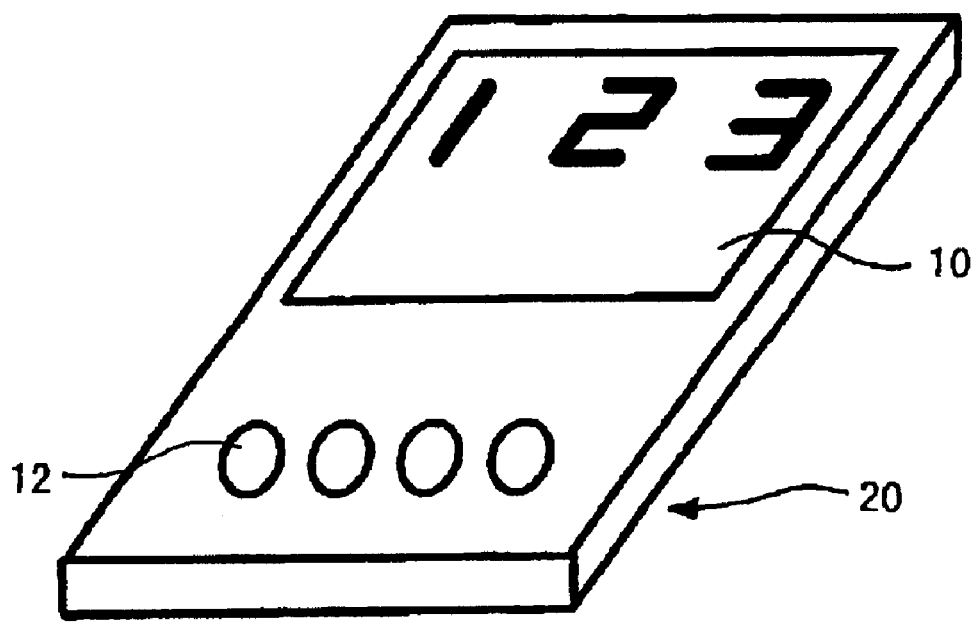
FIG. 3 is a perspective view illustrating an embodiment of an image display device of the present invention.

FIG. 3 depicts an image display device 20 of the present invention. This display device 20 has an image display medium 10, which is similar to the image display medium shown in FIG. 1, a driving circuit, an operation circuit, inside memories, a power source, etc. (not shown). Electrodes of the display medium 10 is in the form of a dot matrix for selectively impressing an electric field to respective cells. Designated as 12 is an array of information inputting keys to drive the dot matrix.

The following examples will further illustrate the present invention. Parts are by weight.
Preparation of Soluble Polymeric Material

PREPARATION EXAMPLE 1

In a flask equipped with a stirrer, a thermometer and a reflux condenser, 300 parts of isoparaffin (ISOPAR H (manufactured by Exxon Chemical Inc.)) were placed and heated to 85° C. C. Next, a solution containing 40 parts of lauryl methacrylate and 1 part of benzoyl peroxide (initiator) was added dropwise through 1 hour with stirring. The mixture was further heated at that temperature with stirring for 5 hours to complete the reaction. The solvent (isoparaffin) was then removed in a vacuum evaporator to obtain viscous polymeric material No. 1 soluble in isoparaffin.

PREPARATION EXAMPLE 2

In a flask equipped with a stirrer, a thermometer and a reflux condenser, 300 parts of isoparaffin (ISOPAR H (manufactured by Exxon Chemical Inc.)) were placed and heated to 85° C. C. Next, a solution containing 36 parts of lauryl methacrylate, 1 part of methacrylic acid and 1 part of benzoyl peroxide (initiator) was added dropwise through 1 hour with stirring. The mixture was further heated at that temperature with stirring for 5 hours to complete the reaction. The solvent was then removed in a vacuum evaporator to obtain viscous polymeric material No. 2 soluble in isoparaffin.

PREPARATION EXAMPLE 3

In a flask equipped with a stirrer, a thermometer and a reflux condenser, 300 parts of a silicone oil (SH-200 (manufactured by Toray Dow Corning Silicone Inc.; 1 cs) were placed and heated to 80° C. C. Next, a solution containing 39 parts of a polymeric material obtained from a monomer having the above formula (1) in which $R_1$ is a methyl group, x is 3 and n is 10, 1 part of methacrylic acid and 3 parts of azobisisobutyronitrile (initiator) was added dropwise through 1 hour with stirring. The mixture was further heated at that temperature with stirring for 5 hours to complete the reaction. The solvent was then removed in a vacuum evaporator to obtain viscous polymeric material No. 3 soluble in silicone oil.

PREPARATION EXAMPLE 4

In a flask equipped with a stirrer, a thermometer and a reflux condenser, 300 parts of a silicone oil (SH-200 (manufactured by Toray Dow Corning Silicone Inc.; 1cs) were placed and heated to 80° C. C. Next, a solution containing 37 parts of a polymeric material obtained from a monomer having the above formula (1) in which $R_1$ is a methyl group, x is 3 and n is 10, 1 part of methacrylic acid, 2 parts of vinylpyrrolidone and 3 parts of azobisisobutyronitrile (initiator) was added dropwise through 1 hour with stirring. The mixture was further heated at that temperature with stirring for 5 hours to complete the reaction. The solvent was then removed in a vacuum evaporator to obtain viscous polymeric material No. 4 soluble in silicone oil.
Preparation of Electrophoretic Particles

PREPARATION EXAMPLE 5

In a flask equipped with a stirrer, a thermometer and a reflux condenser, 500 parts of a silicone oil (SH-200 (manufactured by Toray Dow Corning Silicone Inc.; 1 cs) were placed and heated to 85° C. C. Next, a solution containing 4 parts of a polymeric material obtained from a monomer having the above formula (1) in which $R_1$ is a methyl group, x is 3 and n is 10, 4 parts of dimethylaminoethyl methacrylate, 40 parts of methyl methacrylate, 2 parts of N-acryloylmorphirine and 3 parts of azobisisobutyronitrile (initiator) was added dropwise through 1 hour with stirring. The mixture was further heated at that temperature with stirring for 5 hours to complete the reaction. The solvent was then removed in a vacuum evaporator to obtain a solid binder resin. Subsequently, 8 parts of the binder resin, 2 parts of titanium oxide (rutile) and 100 parts of a silicone oil (SH-200 (manufactured by Toray Dow Corning Silicone Inc.; 1 cs) were dispersed using a ball mill for 24 hours. The silicone oil was then evaporated to leave electrophoretic particles No. 1.

PREPARATION EXAMPLE 6

In 4000 parts of a mixed solvent composed of equal amount of water and ethanol, 3 parts of 3-aminopropyltrimethoxysilane and 1 part of trimethylethoxysilane were dissolved to obtain a solution. To this solution 400 parts of titanium oxide (rutile) were added, and the mixture was stirred at room temperature for 1 day. Then, the solid phase was separated, washed with ethanol and then dried to obtain electrophoretic particles No. 2.

Preparation of Electrophoretic Composition and Electrophoretic Display Medium Containing Same

EXAMPLE 1

To 100 parts of isoparaffin (ISOPAR H (manufactured by Exxon Chemical Inc.)) were added 5 parts of titanium oxide particles, 0.1 part of dodecylbenzene sulfonic acid, 10 parts of polymeric material No. 1 obtained in Preparation Example 1 and 0.1 part of a dye (Macrolex Blue RR manufactured by Bayer Corporation)) and the mixture was sonicated for 1 hour to obtain an electrophoretic composition.

A polyester film having a thickness of 100 $\mu$m and an square opening of 1 cm$^2$ was sandwiched between two substrates each having an ITO electrode to form a cell having a thickness of 100 $\mu$m and an area of 1 cm$^2$. The electrophoretic composition prepared above was then charged in the cell to obtain an electrophoretic medium.

EXAMPLE 2

To 100 parts of isoparaffin (ISOPAR H (manufactured by Exxon Chemical Inc.)) were added 5 parts of electrophoretic particles No. 1 obtained in Preparation Example 5, 0.1 part of dodecylbenzene sulfonic acid, 10 parts of polymeric material No. 1 obtained in Preparation Example 1 and 0.1 part of a dye (Macrolex Blue RR manufactured by Bayer Corporation)) and the mixture was sonicated for 1 hour to obtain an electrophoretic composition. The electrophoretic composition was then charged in a cell prepared in the same manner as that in Example 1 to obtain an electrophoretic medium.

EXAMPLE 3

To 100 parts of isoparaffin (ISOPAR H (manufactured by Exxon Chemical Inc.)) were added 5 parts of electrophoretic particles No. 2 obtained in Preparation Example 6, 0.1 part of dodecylbenzene sulfonic acid, 10 parts of polymeric material No. 2 obtained in Preparation Example 2 and 0.1 part of a dye (Macrolex Blue RR manufactured by Bayer Corporation)) and the mixture was sonicated for 1 hour to obtain an electrophoretic composition. The electrophoretic composition was then charged in a cell prepared in the same manner as that in Example 1 to obtain an electrophoretic medium.

EXAMPLE 4

To 100 parts of isoparaffin (ISOPAR H (manufactured by Exxon Chemical Inc.)) were added 5 parts of electrophoretic particles No. 2 obtained in Preparation Example 6, 0.1 part of dodecylbenzene sulfonic acid, 10 parts of polymeric material No. 2 obtained in Preparation Example 2, 1 part of N,N-diethylpropionamide (non-ionic polar compound soluble in isoparaffin) and 0.1 part of a dye (Macrolex Blue RR manufactured by Bayer Corporation)) and the mixture was sonicated for 1 hour to obtain an electrophoretic composition. The electrophoretic composition was then charged in a cell prepared in the same manner as that in Example 1 to obtain an electrophoretic medium.

EXAMPLE 5

To 100 parts of methylphenylsilicone oil (SH556) were added 5 parts of electrophoretic particles No. 2 obtained in Preparation Example 6, 0.1 parts of dodecylbenzene sulfonic acid, 10 parts of polymeric material No. 3 obtained in Preparation Example 3 and 0.1 part of a dye (Macrolex Blue RR manufactured by Bayer Corporation)) and the mixture was sonicated for 1 hour to obtain an electrophoretic composition. The electrophoretic composition was then charged in a cell prepared in the same manner as that in Example 1 to obtain an electrophoretic medium.

EXAMPLE 6

To 100 parts of methylphenylsilicone oil (SH556) were added 5 parts of electrophoretic particles No. 2 obtained in Preparation Example 6, 0.1 parts of dodecylbenzene sulfonic acid, 10 parts of polymeric material No. 4 obtained in Preparation Example 4 and 0.1 part of a dye (Macrolex Blue RR manufactured by Bayer Corporation)) and the mixture was sonicated for 1 hour to obtain an electrophoretic composition. The electrophoretic composition was then charged in a cell prepared in the same manner as that in Example 1 to obtain an electrophoretic medium.

EXAMPLE 7

To 100 parts of methylphenylsilicone oil (SH556) were added 5 parts of electrophoretic particles No. 1 obtained in Preparation Example 5, 0.1 parts of dodecylbenzene sulfonic acid, 10 parts of polymeric material No. 3 obtained in Preparation Example 3 and 0.1 part of a dye (Macrolex Blue RR manufactured by Bayer Corporation)) and the mixture was sonicated for 1 hour to obtain an electrophoretic composition. The electrophoretic composition was then charged in a cell prepared in the same manner as that in Example 1 to obtain an electrophoretic medium.

COMPARATIVE EXAMPLE 1

To 100 parts of methylphenylsilicone oil (SH556) were added 5 parts of titanium oxide particles, 0.1 parts of dodecylbenzene sulfonic acid, and 0.1 part of a dye (Macrolex Blue RR manufactured by Bayer Corporation)) and the mixture was sonicated for 1 hour to obtain an electrophoretic composition. The electrophoretic composition was then charged in a cell prepared in the same manner as that in Example 1 to obtain an electrophoretic medium.

COMPARATIVE EXAMPLE 2

To 100 parts of isoparaffin (ISOPAR H (manufactured by Exxon Chemical Inc.)) were added 5 parts of titanium oxide particles, 10 parts of polymeric material No. 2 obtained in Preparation Example 2 and 0.1 part of a dye (Macrolex Blue RR manufactured by Bayer Corporation)) and the mixture was sonicated for 1 hour to obtain an electrophoretic composition. The electrophoretic composition was then charged in a cell prepared in the same manner as that in Example 1 to obtain an electrophoretic medium.

Image Display Test:

Each of the electrophoretic media obtained in Examples 1 to 7 and Comparative Examples 1 and 2 was tested for stability of dispersion and speed of response. Thus, a voltage of −100 V was applied to the upper ITO electrode to observe the state of the electrophoretic particles. Then a voltage of +100 V was applied to the upper electrode to observe the state of the electrophoretic particles. Such voltage application procedure including a polarity change were repeated 100 times. In addition, the display medium was observed after the applied voltage was off. The above test was also conducted with an applied voltages of −50 V and +50 V. The stability and the speed of response of the electrophoretic media are evaluated according to the following ratings:

A: Excellent (The moving speed of the electrophoretic particles was very high. When the polarity changing operations were performed 100 times, the movement of the particles could be stably repeated. When the voltage was off, the medium kept the state as such.)

B: Good (The moving speed of the electrophoretic particles was not high. When the polarity changing operations were performed 100 times, the movement of the particles could be stably repeated. When the voltage was off, the medium kept the state as such.)

C: Fair (A high response speed was obtained. However, The movement of the particles could be repeated only about 10 times.)

D: No good (The response speed was slow. The movement of the particles could be repeated only about 10 times.)

E: Bad (No response was obtained.)

The results are shown in Table 1.

TABLE 1

| Example No. | Applied Voltage −100 V and +100 V | Applied Voltage −50 V and +50 V |
|---|---|---|
| 1 | A | B |
| 2 | A | A |
| 3 | A | A |
| 4 | A | A |
| 5 | A | A |
| 6 | A | B |
| 7 | A | A |
| Comparative Ex. 1 | C | D |
| Comparative Ex. 2 | D | E |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2002-108296, filed Apr. 10, 2002, inclusive of the specification, claims and drawings, are hereby incorporated by reference herein.

What is claimed is:

1. An electrophoretic composition in the form of a dispersion comprising a dispersion medium, and electrophretic particles dispersed in said dispersion medium and having a color selected from white and non-white colors, said dispersion medium comprising:

(a) a non-polar solvent, (b) a sulfonic acid compound soluble at least partly in said non-polar solvent, and (c) a polymeric material soluble in said non-polar solvent.

2. An electrophoretic composition as set forth in claim 1, wherein said sulfonic acid compound is selected from the group consisting of alkane sulfonic acid, alkylbenzene sulfonic acid and alkylnaphthalene sulfonic acid.

3. An electrophoretic composition as set forth in claim 2 comprising an alkylbenzene sulfonic acid which is a long-chain alkylbenzene sulfonic acid having 10 to 30 carbon atoms.

4. An electrophoretic composition as set forth in claim 1, wherein said polymeric material an acidic group.

5. An electrophoretic composition as set forth in claim 4, wherein said acidic group-containing polymeric material is a polymer or copolymer containing a monomer component selected from the group consisting of acrylic acid, methacrylic acid, maleic acid, maleic anhydride, itaconic acid, itaconic anhydride, fumaric acid, cinnamic acid, crotonic acid, vinylbenzoic acid, 2-methacryloxyethylsuccinic acid, 2-methacryloxyethylmaleic acid, 2-methacryloxyethylhexahydrophthalic acid, 2-methacryloxyethyltrimellitic acid, vinyl sulfonic acid, allyl sulfonic acid, styrene sulfonic acid, 2-sulfoethyl methacrylate, 2-acrylamide-2-methylpropane sulfonic acid, 3-chloroamidephosphoxypropyl methacrylate, 2-methacryloyloxyethyl acid phosphate and hydroxystyrene.

6. An electrophoretic composition as set forth in claim 4, wherein said polymeric material is a polymer obtained from a monomer having the following formula (1):

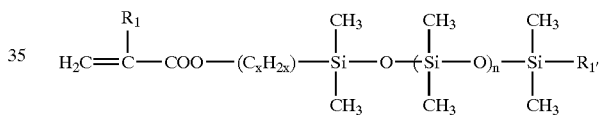

(I)

wherein $R_1$ represents a hydrogen atom or a methyl group; $R_1'$ represents a hydrogen atom or an alkyl group having 1 to 4 carbon atoms, n is an integer and x is an integer of from 1 to 3.

7. An electrophoretic composition as set forth in claim 1, wherein said polymeric material has a non-ionic polar group.

8. An electrophoretic composition as set forth in claim 1, wherein said non-ionic polar group-containing polymeric material is a copolymer of a first copolymerizable monomer and a second copolymerizable monomer, wherein said first copolymerizable monomer is at least one monomer selected from the group consisting of 2-hydroxyethyl acrylate, 2-hydroxyethyl methacrylate, 2,3-dihydroxypropyl acrylate, 2,3-dihydroxypropyl methacrylate, 4-hydroxybutyl acrylate, 4-hydroxybutyl methacrylate, 2-hydroxy-3-propyl methacrylate, 2-chloroethyl acrylate, 2-chloroethyl methacrylate, 2,3-dibromopropyl acrylate, 2,3-dibromopropyl methacrylate, acrylonitrile, methacrylonitrile, isobutyl-2-cyanoacrylate, 2-cyanoethyl acrylate, ethyl-2-cyanoacrylate, methacrylacetone, tetrahydrofurfurylmethacrylate, trifluoroethylmethacrylate, p-nitrostyrene, vinyl pyrrolidone, N-acryloylmorpholine, acrylamide, methacrylamide, N,N-dimethylmethacrylamide and N,N-dibutylmethacrylamide, and wherein said second copolymerizable monomer is at least one monomer selected from the group consisting of alkyl acrylates, alkyl methacrylates, aryl acrylate and aryl methacrylate.

9. An electrophoretic composition as set forth in claim 1, wherein said dispersion medium additionally includes (d) a compound having non-ionic polar group and soluble in said dispersion medium.

10. An electrophoretic composition as set forth in claim 9, wherein said non-ionic polar group is selected from the group consisting of a hydroxyl group, an ester group, an ether group, a ketone group, an aldehyde group, a halogen atom and amide group.

11. An electrophoretic composition as set forth in claim 1, wherein said electrophoretic particles have basic group-containing surfaces.

12. An electrophoretic composition as set forth in claim 11, wherein said electrophoretic particles comprises a binder resin which is insoluble in said non-polar solvent and which is a polymer or copolymer containing a basic group-containing monomer component, and pigment particles supported by said binder resin and having a color selected from white and non-white colors.

13. An electrophoretic composition as set forth in claim 12, wherein said binder resin is a copolymer of a basic group-containing comonomer and another comonomer selected from the group consisting of alkyl acrylates, alkyl methacrylates, aryl acrylate, aryl methacrylate and mixtures thereof, wherein said basic group-containing comonomer is at least one monomer selected from the group consisting of N-methylaminoethyl acrylate, N-methylaminoethyl methacrylate, N-ethylaminoethyl acrylate, N-ethylaminoethyl methacrylate, N,N-dimethylaminoethyl acrylate, N,N-dimethylaminoethyl methacrylate, N,N-diethylaminoethyl acrylate, N,N-diethylaminoethyl methacrylate, N,N-dibutylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyre-ne, diphenylaminoethylstyrene, N-phenylaminoethylstyrene, 2-N-piperidylethyl acrylate, 2-N-piperidylethyl methacrylate, 2-vinylpyridine, 4-vinylpyridine and 2-vinyl-6-methylpyridine.

14. An electrophoretic composition as set forth in claim 12, wherein said binder resin additionally contains a non-ionic polar group.

15. An electrophoretic composition as set forth in claim 14, wherein said binder resin is a copolymer of a basic group-containing comonomer, a non-ionic polar group-containing comonomer and an additional comonomer selected from the group consisting of alkyl acrylates, alkyl methacrylates, aryl acrylate, aryl methacrylate and mixtures thereof, wherein said basic group-containing comonomer, wherein said basic group-containing comonomer is at least one monomer selected from the group consisting of N-methylaminoethyl acrylate, N-methylaminoethyl methacrylate, N-ethylaminoethyl acrylate, N-ethylaminoethyl methacrylate, N,N-dimethylaminoethyl acrylate, N,N-dimethylaminoethyl methacrylate, N,N-diethylaminoethyl acrylate, N,N-diethylaminoethyl methacrylate, N,N-dibutylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyre-ne, diphenylaminoethylstyrene, N-phenylaminoethylstyrene, 2-N-piperidylethyl acrylate, 2-N-piperidylethyl methacrylate, 2-vinylpyridine, 4-vinylpyridine and 2-vinyl-6-methylpyridine, and wherein said non-ionic polar group-containing comonomer is at least one monomer selected from the group consisting of 2-hydroxyethyl acrylate, 2-hydroxyethyl methacrylate, 2,3-dihydroxypropyl acrylate, 2,3-dihydroxypropyl methacrylate, 4-hydroxybutyl acrylate, 4-hydroxybutyl methacrylate, 2-hydroxy-3-propyl methacrylate, methoxypolyethyleneglycol methacrylate, methoxypolypropyleneglycol methacrylate, 2-chloroethyl acrylate, 2-chloroethyl methacrylate, 2,3-dibromopropyl acrylate, 2,3-dibromopropyl methacrylate, acrylonitrile, methacrylonitrile, isobutyl-2-cyanoacrylate, 2-cyanoethyl acrylate, ethyl-2-cyanoacrylate, methacrylacetone, tetrahydrofurfurylmethacrylate, trifluoroethylmethacrylate, p-nitrostyrene, vinylpyrrolidone, N-acryloylmorpholine, acrylamide, methacrylamide, N,N-dimethylmethacrylamide, N,N-dibutylmethacrylamide.

16. An electrophoretic composition as set forth in claim 11, wherein each of said electrophoretic particles comprises a particulate material which has a color selected from white and non-white colors and which has been surface-treated with a monomer having a basic group or a silane coupling agent having a basic group.

17. An electrophoretic composition as set forth in claim 16, wherein said basic group-containing monomer is at least one monomer selected from the group consisting of N-methylaminoethyl acrylate, N-methylaminoethyl methacrylate, N-ethylaminoethyl acrylate, N-ethylaminoethyl methacrylate, N,N-dimethylaminoethyl acrylate, N,N-dimethylaminoethyl methacrylate, N,N-diethylaminoethyl acrylate, N,N-diethylaminoethyl methacrylate, N,N-dibutylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyre-ne, diphenylaminoethylstyrene, N-phenylaminoethylstyrene, 2-N-piperidylethyl acrylate, 2-N-piperidylethyl methacrylate, 2-vinylpyridine, 4-vinylpyridine and 2-vinyl-6-methylpyridine.

18. An electrophoretic composition as set forth in claim 16, wherein said basic group-containing coupling agent is selected from the group consisting of γ-aminopropyltrimethoxysilane, γ-aminopropyltriethoxysilane, N-phenyl-γ-aminopropyltrimethoxysilane, N-(β-aminoethyl)-γ-aminopropyltrimethoxysilane and N-(β-aminoethyl)-γ-aminopropyltrimethoxysilane.

19. An electrophoretic composition as set forth in claim 1, further comprising a dye dissolved in said dispersing medium and having a color different from that of said electrophoretic particles.

20. An image display medium comprising a pair of opposing electroconductive layers defining a gap therebetween, and an electrophoretic composition according to claim 1 filled in said gap, at least one of said electroconductive layers being light-transmissive.

21. An image displaying device comprising an image displaying medium according to claim 20.

* * * * *